United States Patent
Roh et al.

(10) Patent No.: US 8,053,132 B2
(45) Date of Patent: Nov. 8, 2011

(54) CATHODE END PLATE AND BREATHABLE FUEL CELL STACK USING THE SAME

(75) Inventors: Gill-Tae Roh, Suwon-si (KR);
Yeong-Chan Eun, Suwon-si (KR);
Jun-Ho Sauk, Suwon-si (KR);
Seong-Jin An, Suwon-si (KR);
Seok-Rak Chang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 675 days.

(21) Appl. No.: 12/057,202

(22) Filed: Mar. 27, 2008

(65) Prior Publication Data

US 2008/0274389 A1    Nov. 6, 2008

(30) Foreign Application Priority Data

May 3, 2007    (KR) .................. 10-2007-0043192

(51) Int. Cl.
*H01M 8/02* (2006.01)
(52) U.S. Cl. ......... 429/456; 429/457; 429/483; 429/517
(58) Field of Classification Search .................. 429/402, 429/403, 405, 456, 457, 517, 483
See application file for complete search history.

(56) References Cited

U.S. PATENT DOCUMENTS

| 6,171,719 | B1 * | 1/2001 | Roy et al. ....................... 429/508 |
| 6,458,479 | B1 * | 10/2002 | Ren et al. ....................... 429/480 |
| 7,833,650 | B2 * | 11/2010 | Langan et al. ................... 429/72 |
| 2002/0197522 | A1 | 12/2002 | Lawrence et al. |
| 2003/0039878 | A1 * | 2/2003 | Miyakoshi et al. ............. 429/34 |
| 2004/0185321 | A1 | 9/2004 | Sutherland et al. |
| 2008/0292927 | A1 * | 11/2008 | An et al. ......................... 429/22 |

FOREIGN PATENT DOCUMENTS

| KR | 2001-0091667 | 10/2001 |
| KR | 2003-0075755 | 9/2003 |
| KR | 10-2005-0036394 | 4/2005 |
| KR | 10-2006-0109475 | 10/2006 |
| WO | WO 2004008563 A2 * | 1/2004 |

OTHER PUBLICATIONS

Korean Patent Abstracts, Publication No. 1020010091667 A; Date of Publication: Oct. 23, 2001; in the name of Hyeok Jang, et al.
Korean Patent Abstracts, Publication No. 1020030075755 A; Date of Publication: Sep. 26, 2003; in the name of Gyeong Hwan Choi, et al.
Korean Patent Abstracts, Publication 1020050036394 A, Published Apr. 20, 2005, for Hong, et al.
Korean Patent Abstracts, Publication 1020060109476 A, Published Oct. 20, 2006, for Saulsbury, et al.

\* cited by examiner

*Primary Examiner* — Gregg Cantelmo
(74) *Attorney, Agent, or Firm* — Christie, Parker & Hale, LLP

(57) ABSTRACT

A cathode end plate for a breathable fuel cell stack including a first plate including a plurality of first openings and a second plate contacting one side of the first plate and including a plurality of second openings exposing two or more first openings of the plurality of first openings.

15 Claims, 4 Drawing Sheets

CATHODE END PLATE AND BREATHABLE FUEL CELL STACK USING THE SAME

CROSS-REFERENCE TO RELATED APPLICATIONS

This application claims priority to and the benefit of Korean Patent Application No. 10-2007-0043192, filed on May 3, 2007, in the Korean Intellectual Property Office, the entire content of which is incorporated herein by reference.

BACKGROUND

1. Field of the Invention

The present invention relates to a cathode end plate and a breathable fuel cell stack incorporating the cathode end plate.

2. Discussion of Related Art

A fuel cell is defined as a cell for generating direct current by converting the chemical energy of fuel into electrical energy. Fuel cells create little environmental pollution and have a high efficiency because fuel and air are supplied from the outside to continuously generate electricity, unlike a conventional cell. Also, since fuel cells continuously generate electricity by means of a chemical reaction rather than combustion of energy sources such as petroleum energy, natural gas and methanol, fuel cells have been highlighted as the future in energy generation.

Fuel cells can be classified into phosphoric acid fuel cells, molten carbonate fuel cells, solid oxide fuel cells, polymer electrolyte type fuel cells, alkaline fuel cells, and others based on the electrolytes used. Each type of fuel cell varies based on fuels used, operating temperatures, catalysts and electrolytes, but generally operates by the same basic principles.

The basic concept of the fuel cell can be explained by the movement of electrons generated by chemical reaction of oxygen and hydrogen. Hydrogen is supplied to an anode electrode, and oxygen is supplied to a cathode electrode. After protons generated from the anode electrode pass through an electrolyte membrane and move to the cathode electrode, they electro-chemically react with the oxygen to generate water. Electrons generated from the anode electrode move to the cathode electrode through an external conductor to generate electricity. Also, heat is generated by the electrochemical reaction of the anode electrode and the cathode electrode. Direct current from, for example, a direct current electromotor, can be used as the power or it can be converted into indirect current by means of an inverter. The heat generated from the fuel cell generates vapor for reformation or is used for cooling and heating, and otherwise, is discharged as heat.

The following reaction equation 1 represents the overall reaction of the operating principle of the fuel cell.

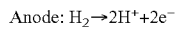

Anode: $H_2 \rightarrow 2H^+ + 2e^-$

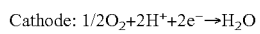

Cathode: $1/2O_2 + 2H^+ + 2e^- \rightarrow H_2O$

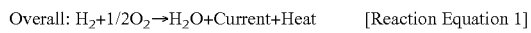

Overall: $H_2 + 1/2O_2 \rightarrow H_2O + Current + Heat$    [Reaction Equation 1]

Fuel cell stacks can be classified as passive type stacks and active type stacks. In the passive type fuel cell system, air is supplied through natural convection while in the active type fuel cell system, air is forcibly supplied to the stack using an air supply such as an air compressor, an air pump, or the like.

"A plurality of unit cells are generally provided in a stacked arrangement compressed together to form a stack." In the passive type fuel cell system, unit cells are planar, thereby occupying a larger area and making uniform compression of the unit fuel cells difficult. When the compression is not uniform, debris may infiltrate the fuel cell stack or material inside the fuel cell stack may leak, interfering with the effective operation of the fuel cell.

A uniform compression may be achieved when the end plate of the fuel cell stack is relatively thick. However, since the fuel cell stack often involves devices that are relatively thin and small so they can be used in mobile equipment such as a notebook computer, a personal digital assistant (PDA), a portable multimedia player (PMP), or a cellular phone, for example, limitations exist on the thickness of the end plate, and of the fuel cell in general.

SUMMARY

According to aspects of the present invention, a cathode end plate is provided capable of efficiently securing an air injecting path and obtaining a uniform compression without increasing a thickness of the cathode end plate, and a breathable fuel cell stack is provided incorporating the cathode end plate described above.

In one exemplary embodiment, a cathode end plate for a breathable fuel cell stack is provided including a first plate including a plurality of first openings and a second plate contacting one side of the first plate and including a plurality of second openings exposing two or more first openings of the plurality of first openings.

In another exemplary embodiment, a porosity of the second plate is greater than a porosity of the first plate. Further, an interior side wall of each second opening of the plurality of second openings may be tapered. In one exemplary embodiment, the first plate includes metal, for example, stainless steel. Additionally, the second plate may include metal with an insulating coating or insulating polymer material.

In yet another exemplary embodiment, a breathable fuel cell stack is provided including a membrane electrode assembly having an anode electrode, a cathode electrode, and an electrolyte membrane between the anode electrode and the cathode electrode. The fuel cell stack also includes a first current collector having through-holes for allowing air to be supplied to the cathode electrode, a second current collector comprising a flow passage for supplying fuel to the anode electrode, a cathode end plate and an anode end plate bookending the first current collector, the membrane electrode assembly, and the second current collector, and connectors for connecting the cathode end plate and the anode end plate. The cathode end plate includes a first plate having a plurality of first openings and a second plate contacting an interior surface of the first plate, the second plate having a plurality of second openings, each second opening exposing two or more first openings of the plurality of first openings.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
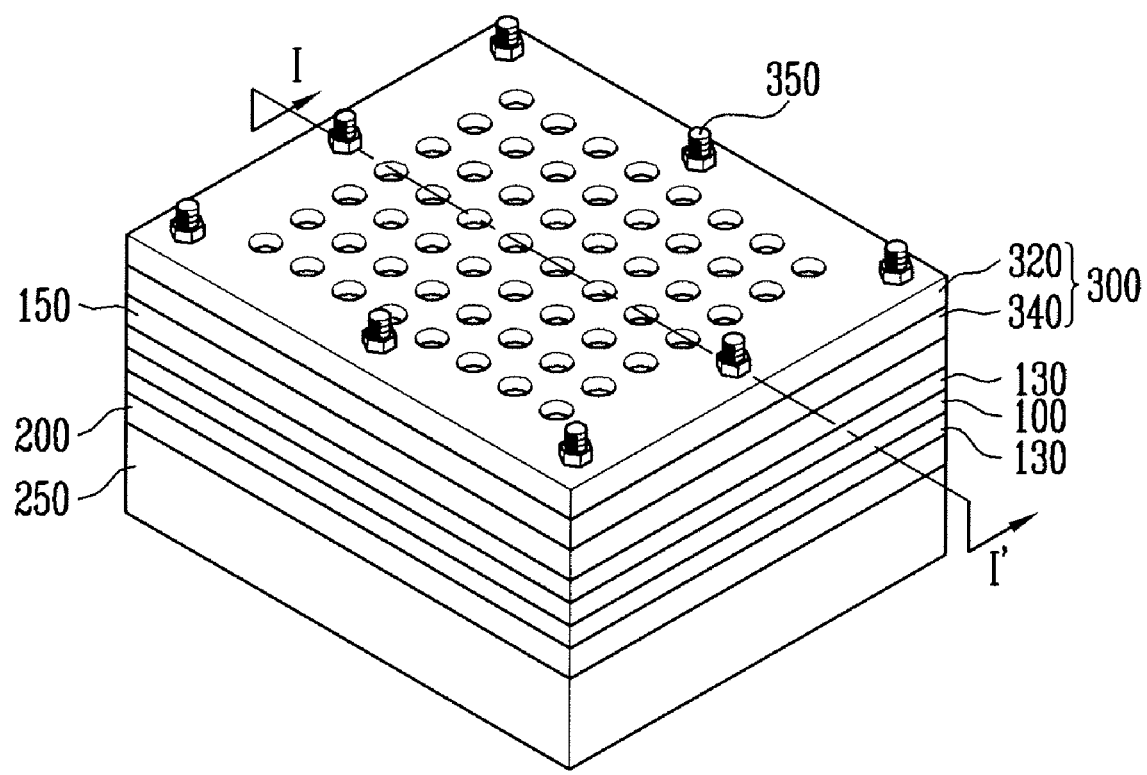
FIG. 1 is a perspective view of a breathable fuel cell stack according to an exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

A breathable fuel cell stack is a power generation system supplying electrical energy to portable electronic equipment such as a notebook computer, a personal digital assistant (PDA), a mobile communication terminal by using fuel and oxygen. More specifically, the fuel cell stack generates electrical energy by electrochemically reacting hydrogen obtained by reforming fuel or pure hydrogen and oxygen in the air, wherein the fuel may include hydrogen-containing liquid or air such as methanol, ethanol, or natural gas, among others.

Figure 2:
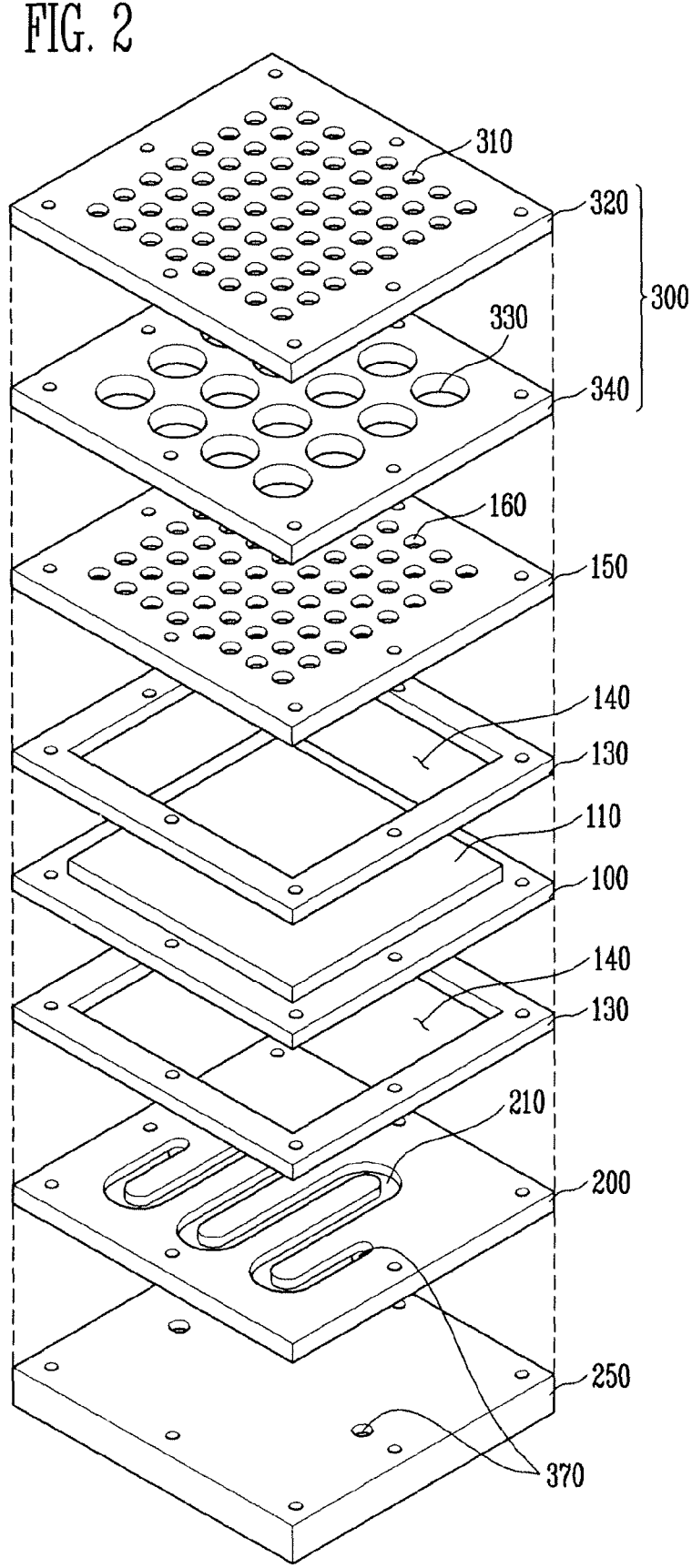
FIG. 2 is an exploded perspective view of the breathable fuel cell stack of FIG. 1.

Referring to FIGS. 1 and 2, a breathable fuel cell stack includes a membrane electrode assembly (MEA), a first current collector 150, a cathode end plate 300 including a first plate 320 and a second plate 340, a second current collector 200, an anode end plate 250, and connectors 350. In FIG. 2, the connectors have been omitted for convenience of illustration.

The MEA includes a electrolyte membrane 100, a cathode 110, and an anode 120. The cathode 110 is referred to as a cathode electrode, and the anode 120 is referred to as an anode electrode. The MEA generates electricity by an electro-chemical reaction of fuel supplied to the anode 120 and oxygen supplied to the cathode 110.

The electrolyte membrane 100 can be manufactured of a proton conductive polymer, wherein the proton conductive polymer may be, for example, a fluorine-based polymer, a ketonic polymer, a benzimidazolic polymer, an esteric polymer, an amide-based polymer, an imide-based polymer, a sulfonic polymer, a styrenic polymer, a hydro-carbonaceous polymer.

The cathode 110 may include a catalyst layer, a microporous layer and a backing layer. Similarly, the anode 120 may include a catalyst layer, a microporous layer and a backing layer. The catalyst layers of the cathode 110 and the anode 120 perform a reaction promotion role, allowing the supplied fuel or oxidant to chemically react rapidly. The micorporous layers allow the fuel or oxidant to be uniformly distributed and supplied to the respective catalyst layers, and in particular, the microporous layers allow water generated by the catalyst layer of the cathode to be smoothly discharged. Further, the backing layers of the cathode and the anode back the catalyst layers, disperse fuel, water, and air, etc., collect generated electricity, and prevent or reduce erosion or other destruction of each catalyst layer.

The MEA is a core element of the fuel cell stack, wherein the output voltage of one MEA is about 1V, and the output current density of one MEA is about 300 mA/cm$^2$. The number and size of the MEA can be customized according to required capacities by the purpose of the fuel cell.

The first current collector 150, which transfers the current generated by the electro-chemical reaction in the stack to an external circuit, is positioned between the MEA 100 and the cathode end plate 300. The first current collector 150 includes through-holes 160 corresponding to the first openings 310 of the first plate 320 for the intake and discharge of external air. The through-holes 160 may be circular, oval, or polygonal. In one exemplary embodiment, the first current collector 150 does not react to the oxygen in the intake air.

The second current collector 200, which transfers the current generated by the electro-chemical reaction in the stack to an external circuit, is composed of a conductive material. The second current collector 200 includes a flow passage 210 for efficiently transporting intake fuel to the MEA, and a manifold connected to both ends of the flow passage 210. In one exemplary embodiment, the second current collector does not react to hydrogen, and has a low contact resistance, a low resistance ratio, and good bonding properties. Graphite, carbon, metals coated with corrosion-resistance materials, or alloys with strong corrosion resistance may be used for the second current collector.

Gaskets or packings 130 have a rectangular ring shape with an opening 140, are positioned between the MEA and the first current collector 150, and between the MEA and the second current collector 200, and seal the diffusion layer of the MEA managing the flow of the fuel or the oxidant. The gasket 130 may be composed of relatively elastic and heat and wear resistance material. In one exemplary embodiment, the gasket can be provided as a semi-hardened pad form with a molded pattern, or can be applied as a slurry material that is hardened. Nonlimiting exemplary gasket materials include rubbers or polymers, for example, ethylene propylene rubber, silicon, silicon-based rubber, acrylic rubber, and thermoplastic elastomer (TPE).

The anode end plate 250 is connected by compression to the cathode end plate 300 by connectors 350, and includes a manifold 370 for allowing fuel to flow in and out, and which is aligned with the manifold of the second current collector 200. The anode end plate 250 has insulation to electrically insulate the anode end plate from the second current collector 200. The insulation may be provided as a coating layer on a material surface.

The cathode end plate 300, located on an outermost edge of the breathable fuel cell stack, absorbs and distributes the compression to reduce the contact resistance between components, and includes the first plate 320 and the second plate 340 divided into a double structure.

The first plate 320 includes a plurality of first openings 310 through which air flows. The first plate 320 may be in contact with the atmosphere, and can be composed of stainless steel or other metals.

The second plate 340 contacts an interior side of the first plate 320, and includes a plurality of second openings 330 exposing two or more first openings 310. Since the second plate 340 directly contacts the interior of the first current collector 150, the second plate may be composed of metal having an insulating coating such as an insulating polymer material to electrically insulate the plates.

The first plate 320 improves the overall compression of the fuel cell stack and the second plate 340 smoothes the influx of the air. The thickness of the cathode end plate 300 described above is about the same as the thickness of the anode end plate 250, and makes the compression further uniform and the influx of the air smooth.

All of the components are connected by the connectors 350, which may be, for example, a bolt and a nut including an insulating coating layer.

Figure 3:
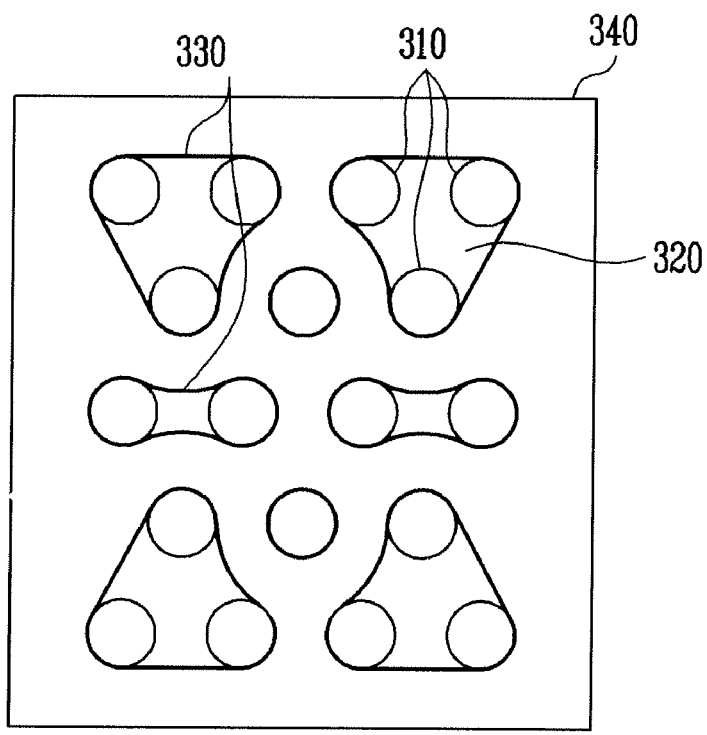
FIG. 3 is a plan view of a cathode end plate according to another exemplary embodiment of the present invention.

FIG. 3 is a plan view of a cathode end plate according to another exemplary embodiment of the present invention, wherein the correlation between the first openings 310 and the second openings 330 is shown when the first plate 320 and the second plate 340 are stacked.

Referring to FIG. 3, showing the first plate 320 behind the second plate 340, the first openings 310 in the first plate 320 are exposed alone, or in a group of two or three through the second openings 330 of the second plate 340. Therefore, the porosity of the second plate 340 is higher than that of the first plate 320.

A double structure of the cathode end plate according to the present embodiment makes the compression in the stack uniform, wherein the porosity of the second plate 340 is larger than that of the first plate 320 to make circulation of the air to the cathode smoother.

Figure 4A:
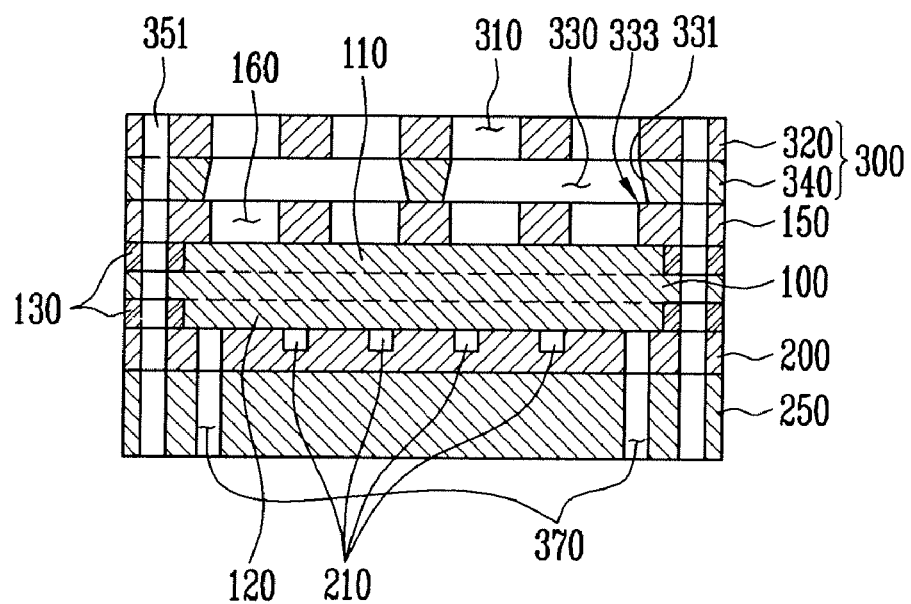
FIG. 4A is a cross-sectional view of a breathable fuel cell stack according to yet another exemplary embodiment of the present invention.
Figure 4B:
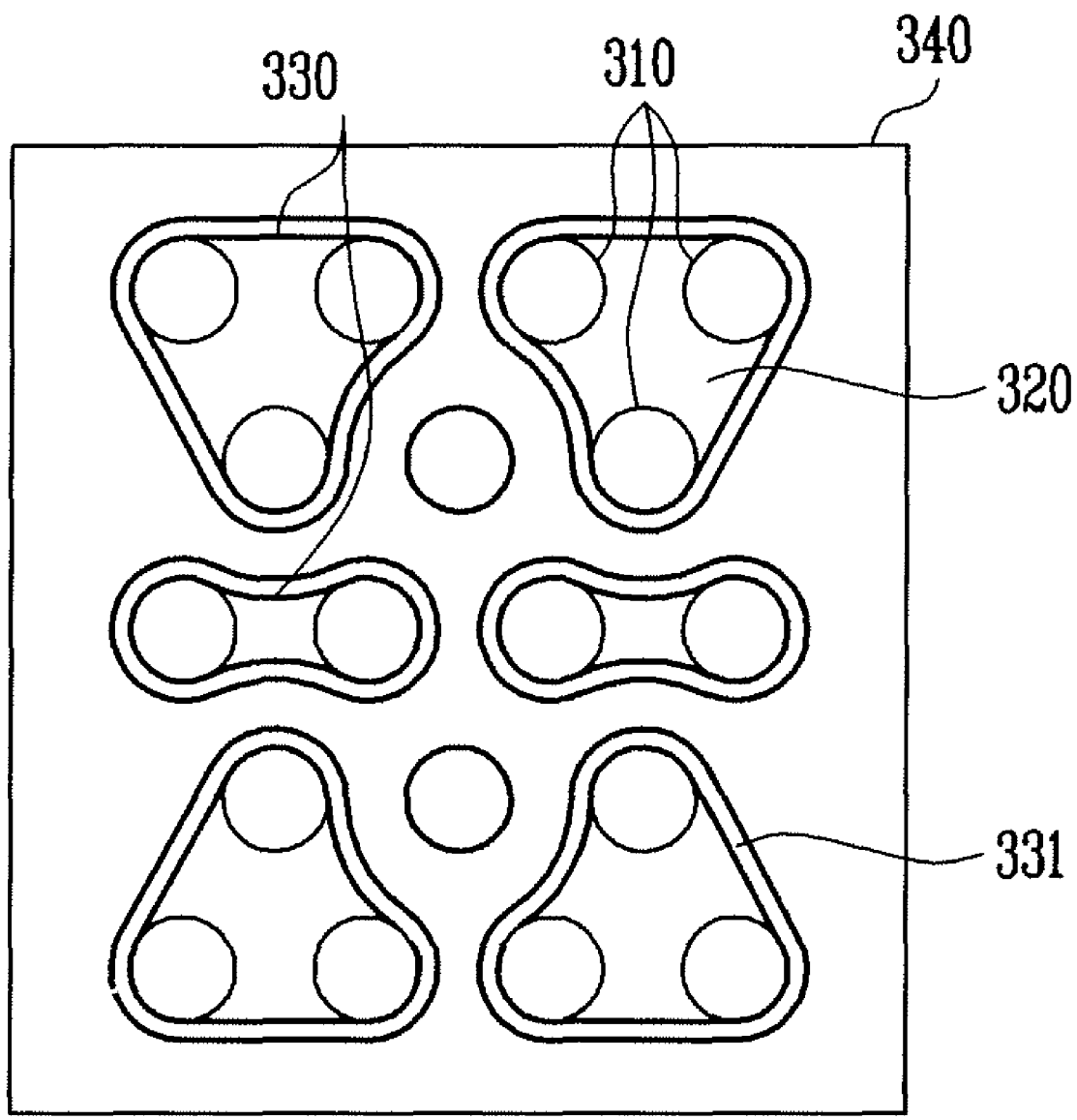
FIG. 4B is a plan view of a cathode end plate of FIG. 4A.

FIG. 4A is a cross-sectional view of a breathable fuel cell stack according to another exemplary embodiment of the present invention. FIG. 4B is a plan view of a cathode end plate of FIG. 4A. FIG. 4A corresponds to a cross-sectional view taken along I-I' line of the FIG. 1.

As shown in FIGS. 4A and 4B, the size of each second opening 330 on the first main surface of the second plate 340 which is in contact with the first plate 320 is smaller than that of the second opening 330 on the second main surface of the second plate 340 which is in contact with the first current collector 150. In other words, the second opening 330 of the second plate 340 is narrowed more and more from the first current collector 150 toward the first plate 320. Also, an interior sidewall 331 of the second opening 330 is configured so as not to form a step with the edge of the first opening 310 of the first plate 320 and so as to form a step 333 with the edge of the through holes 160 of the first current collector 150. Furthermore, the second opening 330 of the second plate 340 is great at the size enough to comprise two or more the first opening 310 of the first plate 320. The through holes 160 of the first current collector 150 are in contact with the second main surface of the second plate 340 and are generally aligned with the first opening 310 of the first plate 320. According to the above configuration, the membrane electrode assembly and the first current collector 150 are combined more strongly by concentrating the coupling force between the second openings 330. Also, it can be made a good flow of ambient air by increasing the size of the second opening 330.

Gaskets 130 are provided between the MEA and the first current collector 150, and between the MEA and the second current collector 200. The second current collector 200 and the anode end plate 250 include the manifold 370 for allowing fuel to flow in and out, and the second current collector 200 includes the flow passage 210 for transporting the fuel. All of the components are connected by the connectors 350. In FIG. 4A, the connectors are omitted, and only hole 351 through which the connectors are insertable is shown.

All of the openings and through-holes can be any suitable shape, and are not limited to being circular. Additionally, the end plate may include more than two plates and still allow a uniform compression and sufficient air to be supplied.

According to the present invention, the cathode end plate has a double structure to apply a uniform compression to the entire breathable fuel cell stack and to allow air to be supplied from the outside while having generally the same thickness compared to a conventional fuel cell stack, allowing the breathable fuel cell stack to be used in slim or compact mobile equipment.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A cathode end plate for a breathable fuel cell stack, the cathode end plate comprising:
a first plate including a plurality of first openings, wherein the first plate is configured to be located at a first outer end of the breathable fuel cell stack; and
a second plate adjacent to one side of the first plate and including a plurality of second openings, wherein at least one of the second openings communicates with two or more of the first openings and wherein the second plate comprises a metal with an insulating coating.

2. The cathode end plate for a breathable fuel cell stack as claimed in claim 1, wherein a porosity of the second plate is greater than a porosity of the first plate.

3. The cathode end plate for a breathable fuel cell stack as claimed in claim 1, wherein an interior side wall of each second opening of the plurality of second openings is tapered.

4. The cathode end plate for a breathable fuel cell stack as claimed in claim 1, wherein the first plate comprises a metal.

5. The cathode end plate for a breathable fuel cell stack as claimed in claim 4, wherein the metal is stainless steel.

6. A breathable fuel cell stack comprising:
a membrane electrode assembly comprising an anode electrode, a cathode electrode, and an electrolyte membrane between the anode electrode and the cathode electrode;
a first current collector comprising through-holes for allowing air to be supplied to the cathode electrode;
a second current collector comprising a flow passage for supplying fuel to the anode electrode;
a cathode end plate and an anode end plate bookending the first current collector, the membrane electrode assembly, and the second current collector; and
connectors for connecting the cathode end plate and the anode end plate,
wherein the cathode end plate comprises a first plate including a plurality of first openings, and a second plate contacting an interior surface of the first plate, the second plate comprising a plurality of second openings, each second opening exposing two or more first openings of the plurality of first openings.

7. The breathable fuel cell stack as claimed in claim 6, wherein a porosity of the second plate is greater than a porosity of the first plate.

8. The breathable fuel cell stack as claimed in claim 6, wherein an interior side wall of each second opening of the plurality of second openings is tapered.

9. The breathable fuel cell stack as claimed in claim 6, wherein a thickness of the anode end plate is substantially similar to a thickness of the cathode end plate.

10. The breathable fuel cell stack as claimed in claim 6, wherein each through-hole of the first current collector is aligned with a first opening of the plurality of first openings.

11. The breathable fuel cell stack as claimed in claim 6, wherein the first plate comprises a metal.

12. The breathable fuel cell stack as claimed in claim 11, wherein the metal is stainless steel.

13. The breathable fuel cell stack as claimed in claim 6, wherein the second plate comprises a metal with an insulating coating.

14. The breathable fuel cell stack as claimed in claim 6, further including gaskets between the membrane electrode assembly and the first current collector and between the membrane electrode assembly and the second current collector.

15. The breathable fuel cell stack as claimed in claim 6, wherein each connector comprises a bolt and a nut including an insulating coating layer.

* * * * *